United States Patent [19]

Warde et al.

[11] Patent Number: 4,481,531

[45] Date of Patent: Nov. 6, 1984

[54] MICROCHANNEL SPATIAL LIGHT MODULATOR

[75] Inventors: Cardinal Warde, Cambridge; Jeffrey H. Shapiro, Sharon, both of Mass.

[73] Assignee: Massachusetts Institute of Technology, Cambridge, Mass.

[21] Appl. No.: 569,944

[22] Filed: Jan. 13, 1984

Related U.S. Application Data

[63] Continuation of Ser. No. 848,179, Nov. 3, 1977, abandoned.

[51] Int. Cl.³ .................. H04N 9/31; G02F 1/13; H01J 31/50; H01J 43/00
[52] U.S. Cl. ..................... 358/60; 350/342; 350/374; 315/169.1; 250/213 R; 353/31; 313/528; 313/534
[58] Field of Search .......... 313/95, 103 CM, 105 CM; 350/342, 374; 353/31; 358/60-63, 241; 250/213 R; 315/169.1, 169.2, 169.3, 169.4; 364/822, 837

[56] References Cited

U.S. PATENT DOCUMENTS

| | | | |
|---|---|---|---|
| 3,567,947 | 3/1971 | Robbins | 250/213 R |
| 3,854,066 | 12/1974 | Payne | 313/105 CM |
| 3,864,595 | 2/1975 | Lawerence et al. | 313/103 CM X |
| 3,868,536 | 2/1975 | Enck, Jr. | 313/95 X |
| 4,127,322 | 11/1978 | Jacobson et al. | 358/61 X |
| 4,150,396 | 4/1979 | Hareng et al. | 358/60 |
| 4,191,456 | 3/1980 | Hong et al. | 358/61 |
| 4,251,842 | 2/1981 | Iwasaki et al. | 360/32 |
| 4,272,157 | 6/1981 | Collins, Jr. et al. | 350/374 |

OTHER PUBLICATIONS

A Pockels-Effect Light Valve: Phototitus, Applications to Optical Image Processing, Donjon et al., IEEE Transactions on Electron Devices, vol. ED 20, No. 11, pp. 1037-1042, Nov. 1973.
Resolution and Imaging Characteristics of a Proximity-addressed Electro-Optic Plate-M. Y. Burmawi-Thesis-MIT Library-Nov. 12, 1976.
Speed and Resolution of A Microchannel-Addressed Optical Modulator, D. M. Cocco-thesis-submitted Aug. 1977.
Spatial Light Modulators, D. Casasent, Pro. of the IEEE, vol. 65, No. 1, Jan. 1977, pp. 143-157.
Low-Visibility Optical Communications, Devices and Techniques for Improved Performance-pre-print of paper presented at NSF user-grantee MTG, New York, N.Y., Jun. 1977, by Warde.
A New Color-TV Projector, Jacobson et al., SID 77, Digest, pp. 106-107.
Information Input in an Optical Pattern Recognition System Using A Relay Tube Based on the Pockels Effect, Groth et al.-Optics Communications, vol. 2, No. 3, Aug. 1970, pp. 133-135.
Projection Television, Wireless World, vol. 82, No. 1489, pp. 47-52, Sep. 1976, A. Robertson.
Coupled-Wave Analysis of Holographic Storage in $LiNbO_3$, Staebler & Amodoi, J. Appl. Phys., vol. 43, No. 3, Mar. 1972, pp. 1042-1049.
Fe-Doped $LiNbO_3$ for Read-Write Applications, Staebler and Phillips Applied Optics, vol. 13, No. 4, Apr. 1974, pp. 788-794.
Varian Bulletin, Applications for Microchannel Plates, pp. 1-12.

*Primary Examiner*—Aristotelis M. Psitos
*Attorney, Agent, or Firm*—Arthur A. Smith, Jr.; Sam Pasternack

[57] ABSTRACT

A microchannel spatial light modulator that has a photocathode to receive incident light and to provide a spatial distribution of photoelectrons (herein called an electron image) whose spatial number density is proportional to the spatial intensity of the incident light. A microchannel plate is provided to receive the photoelectrons and to amplify the electron image. An electro-optic plate is provided to receive the amplified electron image; there is a dielectric mirror coating and an insulating light-blocking layer at one major surface thereof to receive the electron image and a transparent electrode at the other major surface thereof for biasing purposes. All of the foregoing elements are contained within a vacuum housing; suitable electrical potentials are applied to effect the necessary results. The modulator is capable of real-time phase or intensity modulation.

24 Claims, 8 Drawing Figures

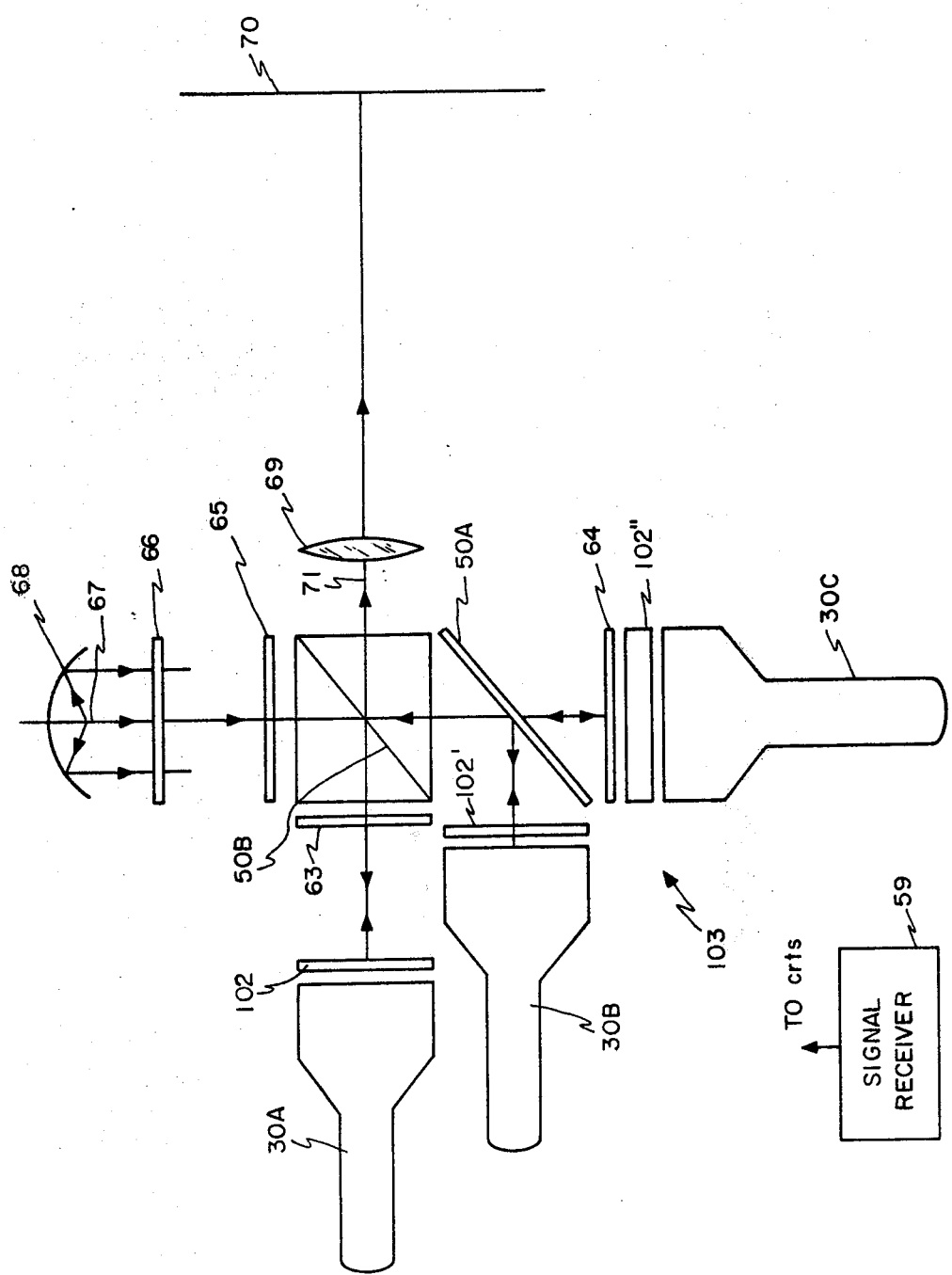

MICROCHANNEL SPATIAL LIGHT MODULATOR

The Government has rights in this invention pursuant to Grant No. ENG 74-00131-A01 and Institutional Patent Agreement No. 0010, awarded by the National Science Foundation.

This is a continuation, of application Ser. No. 848,179, filed Nov. 3, 1977 now abandoned.

The present invention relates to microchannel spatial light modulators for real-time phase or intensity modulation of light.

By way of background, attention is called to two theses supervised by one of the present inventors at the Massachusetts Institute of Technology and based on ideas proposed jointly by the present inventors: "Speed and Resolution of a Microchannel-Addressed Optical Modulator", (Cocco) and "Resolution and Imaging Characteristics of a Proximity-Addressed Electro-Optic Plate", (Burmawi); the latter was deposited in the M.I.T. Library System on Nov. 12, 1976. Attention is also called to a paper entitled "Low-Visibility Optical Communication: Devices and Techniques for Improved Performance," given by one of the present inventors at a National Science Foundation usergrantee meeting in New York, New York, June 1977 (called "Warde paper" herein) and to a Varian bulletin MCP-2819A. Other parallel, spatial light modulators to perform real-time phase or intensity modulation use photoconductive electro-optic crystals or elastomers or liquid crystals. Examples are PROM of Itek Corporation; Phototitus as described in two journal articles, "A Pockels-Effect Light Valve: Phototitus. Application to Optical Image Processing" (Donjon et al.), IEEE Transactions on Electron Devices, Vol. ED-20, No. 11, November. 1973 and "Information Input in an Optical Pattern Recognition System Using a Relay Tube Based on the Pockels Effect," (Groh et al), Optics Communications, Vol. 2, No. 3, August, 1970; Ruticon of Xerox Corporation; and liquid crystal devices of Hughes Corporation.

The background need for modulators of the type herein disclosed and the context within which such modulators may be found are found in the Warde paper as well as in a journal article entitled "Spatial Light Modulators" (Casasent), Proceedings of the IEEE, Vol. 65, No. 1, 1977, pp. 143-157. The present system is called a "distributed electron beam type" in the Warde paper. Such a system can be used in coherent optical signal processing. Because optical systems have the ability to perform parallel signal processing at ultra-high speeds, more and more optical systems are being used in computer apparatus. High speed, re-usable spatial light modulators are badly needed to take full advantage of parallel optical signal processing at high speeds.

Accordingly, it is an object of the present invention to provide a novel spatial light modulator.

Another object is to provide a microchannel light modulator capable of high resolution ($\sim 50$ lines/mm), high speed ($\sim 1000$ frames/second) and high sensitivity (less than $10^{-2}$ergs/cm$^2$) and which can perform both phase and intensity modulation as well as beam steering and beam deflection.

In addition to coherent optical signal processing, the modulator herein disclosed can also be used as a light valve for large screen projection television, for atmospheric phase compensation (see the Warde paper), and as an optical memory and for laser beam steering and deflection. It is still another object to provide a modulator adapted to such other applications.

These and still further objects are addressed hereinafter.

The invention is hereinafter described with reference to the accompanying drawing in which:

FIG. 8 is a diagrammatic representation showing three microchannel spatial light modulators in the context of a large-screen television projection arrangement for color television.

Figure 1:
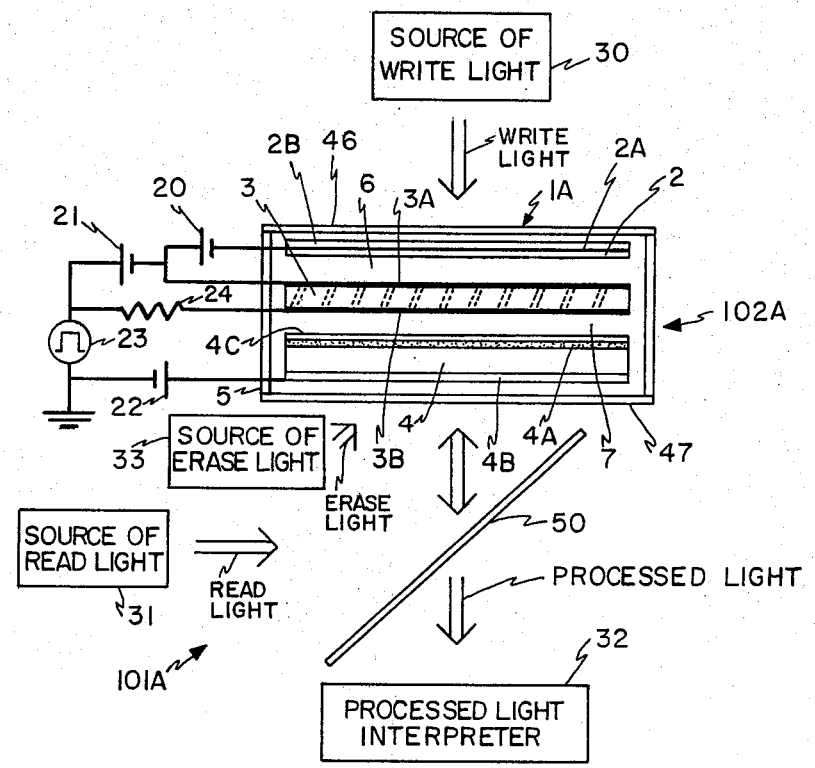
FIG. 1 is a diagrammatic representation of a microchannel spatial light modulator, including a schematically represented electrical biasing means and an elevation view of the device wherein modulation is effected, the modulator shown being adapted to effect phase modulation.

In the explanation that now follows, there is first an overall discussion to place the later, more detailed discussion, in perspective. Referring now to FIG. 1, there is shown at 101A a system that includes a microchannel spatial light modulator or modulator system 102A. The system 101A, as later discussed, further includes a source of incident or write light 30 (which may be a distant star, for example), a source of read light 31 (which may be coherent light such as laser light) a pulsed source of blue or near UV erase light 33 and a processed light interpreter 32 (which may be an array of light detectors or a photographic film). Light modulation is actually accomplished in a modulation device 1A which is electrically biased by electrical circuitry that includes dc source 20, 21 and 22, an ac or pulsed source 23 and an electric current limiting resistor 24; the numerals 20-24 are used in later figures to designate these same circuit elements.

Figure 7:
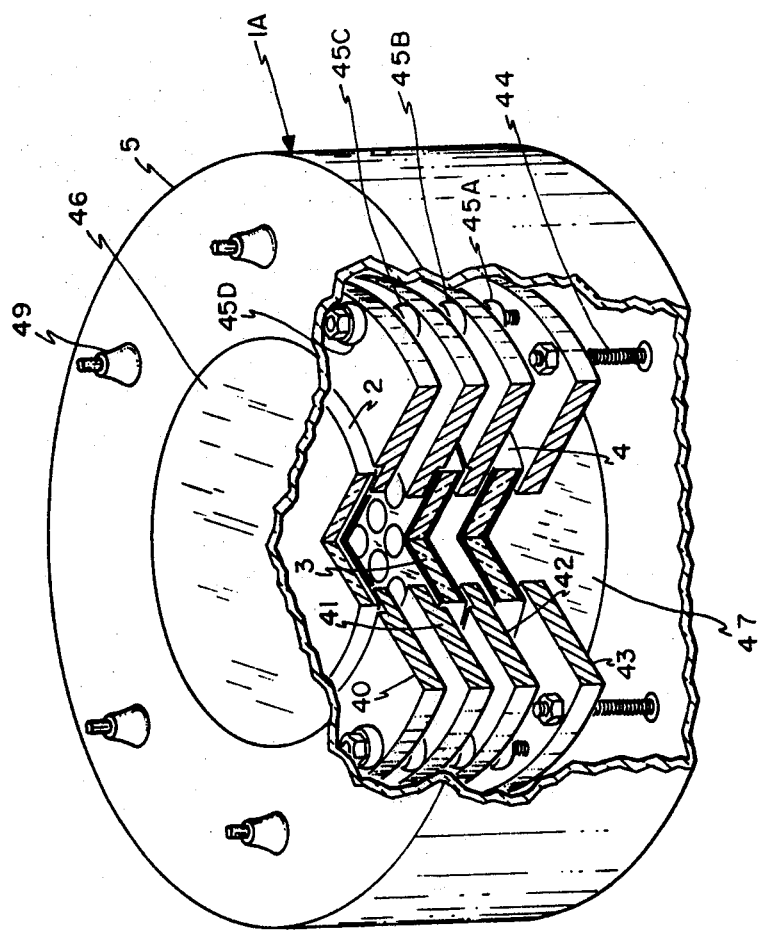
FIG. 7 is an isometric view of said device of FIG. 1.

The modulation device 1A, when appropriately biased, is a microchannel spatial light modulator as now explained. As shown in FIG. 1, the device 1A includes a photocathode 2, a microchannel plate 3 and an electro-optic plate 4 within a vacuum housing 5. The elements 2, 3 and 4, as shown in FIG. 7, have planar major surfaces. The photocathode 2 is spaced from the microchannel plate by a vacuum gap 6 and the microchannel plate 3 is spaced from the electro-optic plate 4 by a further vacuum gap 7. Further structures are associated with the elements 2, 3 and 4 to form composite structures, as explained in the next few paragraphs.

The photocathode 2 is a thin film of a photosensitive material (see RCA Electro-optics Handbook, pp. 152-153) on the upper surface of which there is deposited a thin metal layer (e.g., chromium) that serves as a photocathode electrode 2A. The photocathode and its electrode are usually supported by a transparent substrate 2B as shown in FIGS. 1 and 7, although for some applications the photocathode material can be deposited directly onto the first electrode 3A (discussed below) of the microchannel plate, while in other applications involving extreme ultraviolet radiation and soft x-ray radiation, no photocathode is necessary. The photocathode 2, as later explained in some detail, receives a photon image at its upper planar surface and acts as a source of photoelectrons whose spatial distribution is proportional to the spatial distribution intensity of light incident upon the photocathode; that is, the photocathode provides an electron image of the image in the incident light.

The microchannel plate 3 is a thin wafer of a porous semiconducting glass (see the Varian bulletin for details) having at each of its major surfaces a conductive coating to serve, respectively, as a first planar electrode 3A to receive electrons from the photocathode and a second planar electrode 3B to interact with the first electrode 3A and create an electric field in the porous semiconducting glass 3 to draw electrons through the porous semiconducting glass from the first electrode 3A to the second electrode 3B, there being amplification in the number of electrons between the first electrode and the second electrode so that there is an amplified electron image at the second electrode.

The electro-optic plate is a thin, plane parallel wafer of electro-optic material (later specified). The electro-optic plate 4 has at its upper planar surface a planar dielectric mirror 4A in the form of an insulating layer made by depositing multiple coatings, for example, of silicon dioxide and titanium dioxide on the electro-optic plate 4 and an insulating light-blocking layer 4C deposited on top of the dielectric mirror 4A. The electro-optic plate 4 is sandwiched between the dielectric mirror 4A and a transparent planar electrode 4B. The light-blocking layer 4C faces the second electrode 3B and is separated therefrom by the vacuum gap 7; it receives the amplified electron image from the microchannel plate 3. Whether the microchannel light modulator 102A is used to modulate the phase of an incoming light beam or the intensity thereof, the electro-optic plate 4 must have a low half-wave surface charge density and either high or controlled resistivity. By a material with controlled resistivity is meant a material whose resistivity can be controlled by some convenient process, e.g., a material that is both electro-optic and photo-conductive such as bismuth silicon oxide. Alternatively, the electro-optic plate may have low half-wave surface charge density and the controlled resistivity may be built into the dielectric mirror and the light-blocking layer. For phase modulation, lithium niobate (LiNbO$_3$) used in a longitudinal electro-optic mode may be employed, for example; and, for intensity modulation, deuterated cesium dihydrogen arsenate (CD*A) may be employed, for example. Other examples of electro-optic materials are listed below in Table 1.

TABLE 1

| Phase Modulation and Storage | |
|---|---|
| GROUP I | |
| Lithium Tantalate | (LiTaO$_3$) |
| Lithium Niobate | (LiNbO$_3$) |
| Phase or Intensity Modulation and Storage | |
| GROUP II | |
| Cesium Dihydrogen Arsenate | CDA |
| Deuterated Cesium Dihydrogen Arsenate | CD*A |
| Ammonium Dihydrogen Phosphate | (ADP) |
| Deuterated Ammonium Dihydrogen Phosphate | (AD*P) |

TABLE 1-continued

| | |
|---|---|
| Potassium Dihydrogen Phosphate | (KDP) |
| Deuterated Potassium Dihydrogen Phosphate | (KD*P) |
| Potassium tantalate niobate | (KTa$_x$Nb$_{1-x}$O$_3$) |
| Ammonium Dihydrogen Arsenate | (ADA) |
| Deuterated Ammonium Dihydrogen Arsenate | (AD*A) |
| Zinc Telluride | (ZnTe) |
| Cadmium Telluride | (CdTe) |
| Bismuth Silicon Oxide | (Bi$_{12}$SiO$_{20}$) |
| Gallium Arsenide | (GaAs) |
| Phase or Intensity Modulation and Storage | |
| GROUP III | |
| Lanthanum modified Lead Zirconate Titanate | (PLZT) |

Electrical biasing of the elements 2, 3 and 4 is now discussed. The dc source 20 applies a voltage $V_c$ between the photocathode electrode 2A and the first electrode 3A of the microchannel plate to draw the photoelectrons across the vacuum gap 6. The dc source 21 (having a terminal voltage $V_m$) applies a voltage between the first electrode 3A and the second electrode 3B through the resistor 24 (having a resistance $R_p$) to create the necessary electric field within the microchannel plate 3. The pulsed source 23 (having a pulsed output voltage $V_e$) and the dc source 22 (having a terminal voltage $V_b$) apply biasing potentials between the second electrode 3B and the transparent electrode 4B to draw the amplified electron image across the gap 7. Typically, the gaps 6 and 7 are 1/10 millimeter the electro-optic plate 4 is ½ millimeter thick, $V_c$ is 1–10 volts, $V_m$ is 1000 volts, $R_p$ is 1 MΩ, $V_b$ is 2,000–10,000 volts and $V_e$ is a source of 1–10 kV repetitively pulsed at the framing rate of the device during real-time operation. The voltage $V_e$ serves a reset function, as later explained.

The system 101A is set up to effect phase modulation. For operation of the system 101A in the cycled mode, the pulse generator 23 is off during the write period and it behaves like a short-circuit. A control signal from the source of write light 30 (coherent or incoherent light) illuminates the photocathode 2 and produces, at the back of the microchannel plate 3, an amplified electron image of the optical intensity. This amplified electron image is proximity focused onto the light-blocking layer 4C; that is, photoelectrons from the photocathode, amplified by the microchannel plate, are distributed on a planar upper surface of the image plane 4C such that the spatial density of the electrons is proportional to the spatial intensity of the incident light on the photocathode. The constant-voltage supply 22 maintains the light-blocking layer 4C at a potential above that of the bottom electrode 3B of the microchannel plate 3 to draw the electrons across the gap 7 to the flat upper surface of the light-blocking layer 4C. The charge distribution of the thusly deposited electrons induces a corresponding spatially-varying refractive index in the electro-optic material which is typically an electro-optic crystal of symmetry 3 m (e.g., lithium niobate) cut perpendicular to the c-axis, but any of the materials in Group I of Table 1 will suffice. This spatially varying index of refraction is utilized by means of longitudinal electro-optic effect to phase modulate the readout laser beam from the source 31, as explained below.

The source 31 is typically a laser beam and is the light to be processed in the device 1A. The output beam from the source 31 is reflected off a beam splitter 50 through a bottom window 47 of the housing 5, through the transparent electrode 4B, into the electro-optic plate 4;

it is reflected by the dielectric mirror 4A back downward in FIG. 1 through the beam splitter 50 to the interpreter 32 (for example, a TV camera, a photographic plate or a light detector array). The read light from the source 31 is, in this way, processed in the device 1A by the electro-optic plate 4 whose index of refraction, as above explained, is spatially modulated by the electron image on the dielectric mirror 4A. Erasure of the electron image on the light-blocking layer 4C can be assisted by a source 33 of erase light which is a source of pulsed blue or ultraviolet light, it being possible with some materials to achieve erasure by the processes of photoconduction and photoemission. The source 33 of pulsed erase light 30 must be synchronized with an erase or reset pulse $V_e$ from the pulsed source 23.

The systems labeled 101B, 101C, 101D, 101E and 101F in FIGS. 2, 3, 4, 5 and 6, respectively, have elements that are common with the system 101A and are given identical labels. The modulation devices in FIGS. 2-6 are labeled 1B, 1C, 1D, 1A and 1B, respectively. The functions of the common elements in the later figures are not explained in any further detail in what follows. The later systems also contain elements not included in FIG. 1, which are now taken up.

Figure 2:
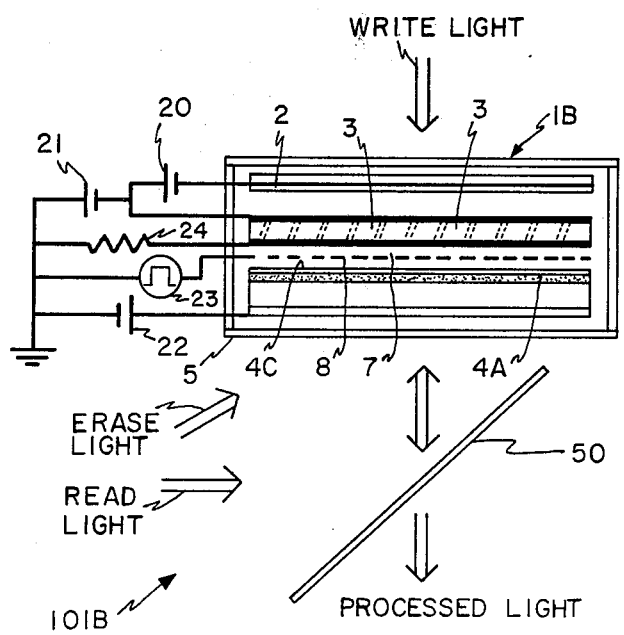
FIG. 2 is a diagrammatic representation, like FIG. 1, showing, among other things, a grid within said device for phase modulation.

The system 101B in FIG. 2, like the system 101A, is set up to effect phase modulation. It differs from the system 101A in that a grid 8 is inserted in the gap 7 between the microchannel plate 3 and the light-blocking layer 4C. The grid 8 allows an external electrical modulation signal to be inserted into the processing capability of the device 1B to control electron flow in the gap 7, and, in addition, it provides an alternative means of stripping electrons from the light-blocking layer 4C during erasure. The grid can also be used to achieve operation of the device in a continuous mode in which (unlike the framed mode described for the system 101A) the writing and erasing of the electron image is a continuous rather than a discrete process.

Figure 3:
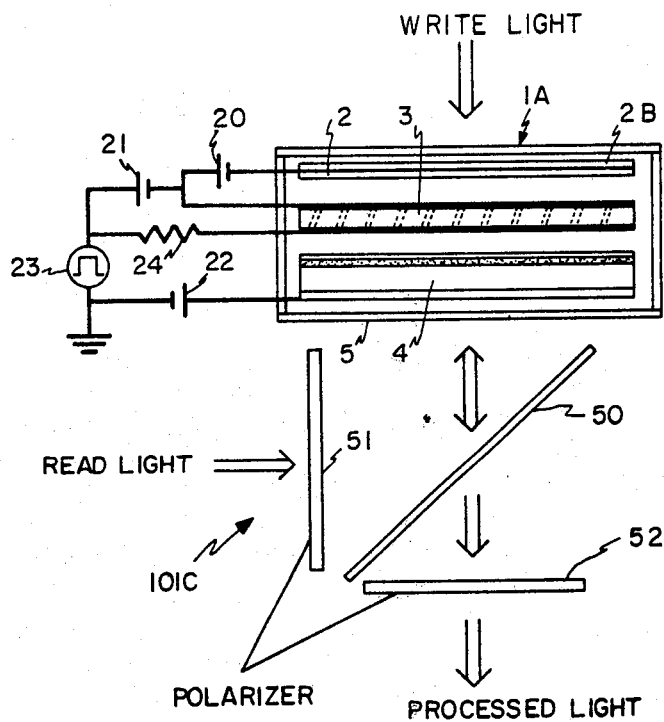
FIG. 3 is a diagrammatic representation, like FIG. 1, of a system wherein intensity modulation is effected.

The system 101C in FIG. 3 is set up to effect either phase or amplitude modulation and each of the materials shown in the first two groups of Table 1, among others, can be used. It differs from the system 101A in that two polarizers, 51 and 52 are placed in the read light and the processed light. To effect phase modulation the axis of polarizer 51 in the read beam is generally oriented parallel to one of the induced axes of the electro-optic material and the processed beam polarizer 52 is either omitted or has its axis aligned along that of the read beam polarizer 51. To effect amplitude modulation, the read beam polarizer 51 is usually aligned with its axis at 45° to the induced axes of the electro-optic material and the processed beam polarizer 52 is crossed with respect to the read beam polarizer 51.

Figure 4:
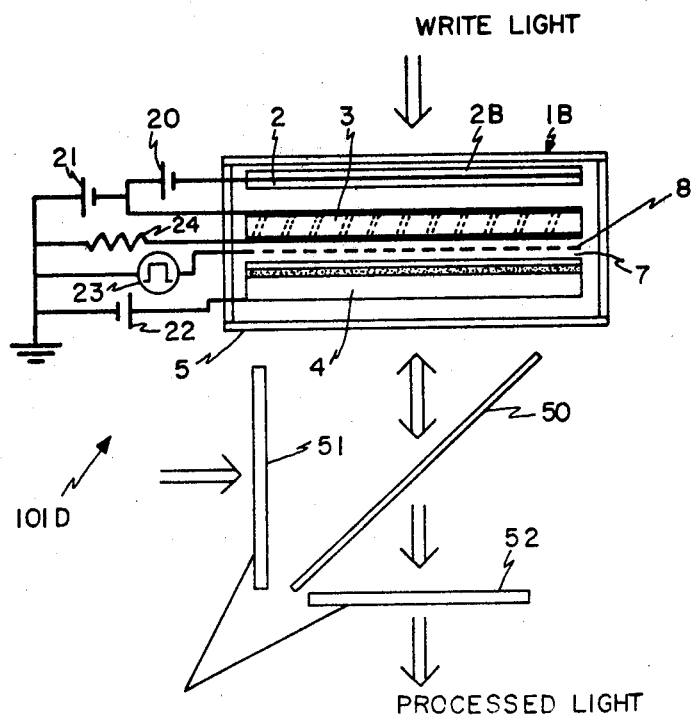
FIG. 4 is a diagrammatic representation, like FIG. 2, of a system wherein intensity modulation is effected.

The system 101D in FIG. 4 is set up to effect either phase or intensity (i.e., amplitude) modulation. It differs from the system 101A in that a grid (again marked 8) is inserted in the gap 7 for the purposes described with regard to the system 101B and that polarizers 51 and 52 are inserted in the read beam and the processed beam as in the system 101C and employed in exactly the same fashion as in the system 101C.

Figure 5:
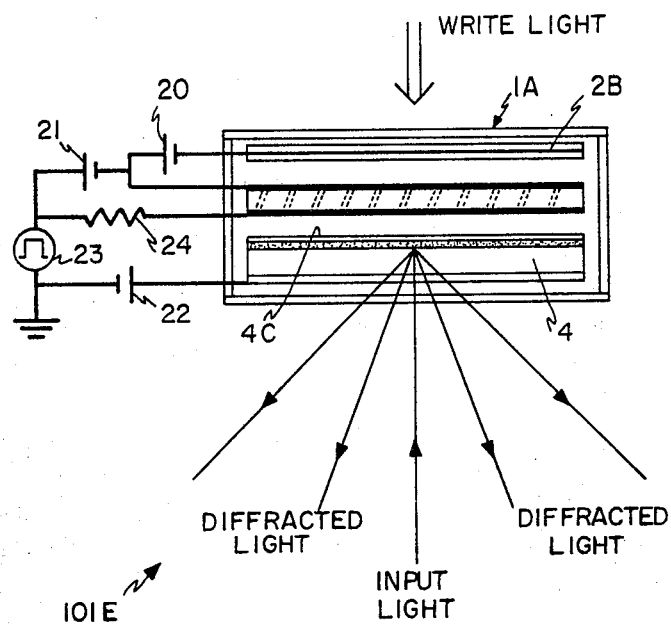
FIG. 5 is a diagrammatic representation, like FIG. 1, wherein the device is used to effect laser beam steering or deflection.

The system 101E in FIG. 5 is set up to effect beam steering or beam deflection. It is essentially the same as the system 101A except that a beam splitter is not needed. The principle employed to steer the light is that of diffraction. By using a write light (control signal) whose intensity is periodic in space, a periodic index of refraction profile (i.e., a phase grating) is set up in the electro-optic material by the process described earlier. The periodic index of refraction then diffracts the input light. By varying the periodicity and orientation of the control write light, two-dimensional beam steering is accomplished.

Figure 6:
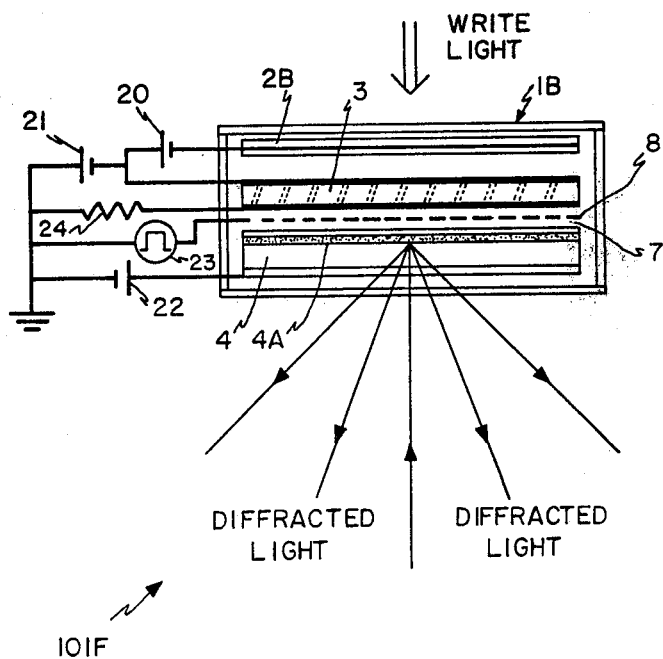
FIG. 6 is a diagrammatic representation, like FIG. 2, wherein the device is used to effect laser beam steering or deflection.

The system 101F in FIG. 6 is also set up to effect beam steering. The principle and operation of the system 101F is similar to that in the system 101E except that a control grid (again labeled 8) is inserted for the same purposes as described with reference to the system 101B.

In the isometric view of FIG. 7, the modulation device is again labeled 1A and the further numerical designations applied are also the same as in FIG. 1, except that further elements are identified in the structure 1A of FIG. 7, as now discussed. The mechanical structural elements in FIG. 7 that serve to maintain the elements 2, 3 and 4 in spaced relationship to one another, include a photocathode flange 40, microchannel plate flanges 41 and 42 and an electro-optic plate flange 43. The flanges are attached to the vacuum enclosure 5 by insulated support studs (e.g., the stud labeled 44) and held in spaced relationship by ceramic spacers (e.g., the spacers labeled 45A–45D) which also serve to electrically isolate the flanges. Electrical feedthroughs (such as 49) serve to pass electrical connections through the housing 5 to specific components of the device 1A. Write light enters the device 1A in FIG. 7 through a quartz or other window 46. Read light enters the device 1A through another quartz or other window 47. The vacuum enclosure 5 is a shielded glass housing, that is, the housing is glass with metal shielding except for the windows 46 and 47. The various facing surfaces of the interacting elements, as above indicated, are all planar and the elements themselves are flat and plane parallel to minimize distortion.

A few matters of a general nature are taken up in this paragraph. The write source 30, as above indicated, may be light from a distant star approximately focused on the photocathode using telescopic apparatus, it may be a small hole like a camera aperture, it may be a camera or some other imaging mechanism. However, the present system takes that optical image and uses it to process read light which is modulated or processed by the write light in the devices 1A–1D and the processed light contains a message that is later interpreted. The devices 1A–1D will operate in a storage mode as optical memories if the electrons are not actively erased from the dielectric mirror 3A. The material PLZT which is found in the third group of Table 1 can also be used in the device as an electro-optic plate to effect phase and intensity modulation as well as storage in the systems 101A and 101B. In the microchannel spatial light modulator, for extremely low level write light applications, the single microchannel plate can be replaced by two (or more) microchannel plates cascaded in series in the conventional chevron configuration and appropriately biased, as discussed in the Varian bulletin.

The system labeled 103 in FIG. 8 is set up to effect the projection of color television images on a large screen 70 ($\sim 3\frac{1}{2}$ feet×5 feet). The system 103 consists of three microchannel spatial light modulators 102, 102', 102" that may be like the modulator 102A in FIG. 1 (or may have grids as in FIG. 2, for example). The sources of write light marked 30A, 30B and 30C are red, green and blue CRTs whose signal can be either taken from the commercial transmitted TV video signals (e.g., by a receiver 59) or from video recording and playback machines or the like or from special circuitry. The source of read light is a high intensity Xenon arc lamp 67 which is reflected from the parabolic reflector 68 and filtered to remove its ultraviolet components by a filter 66 and its infrared components by a filter 65. After passing through and reflecting from a polarizing beam splitter 50B it is further separated into its red, green and blue components by filters 63 and 64 and a green-blue selective dichroic mirror 50A. In fact, the final red, green and blue beams that enter the modulators 102, 102′ and 102″, respectively, constitute light that provides the read function. The light beams reflected back by the modulators 102, 102′ and 102″ are mixed in the polarizing beam splitter 50B and reflected and/or transmitted as a beam 71 that contains the three colors. The beam splitter 50B acts as an input polarizer for light from the source 67 and as an output polarizer for light from the modulators 102, 102′ and 102″. The combined light beam 71 is focused by a projection lens 69 onto the large screen 70. The projection scheme discussed in this paragraph, except for the microchannel spatial light modulators, is similar to that disclosed in a paper entitled "A New Color-TV Projector," Jacobson et al, SID International Symposium, April 1977.

Further modifications of the invention herein disclosed will occur to persons skilled in the art, and all such modifications are deemed to be within the scope of the invention as defined by the appended claims.

What is claimed is:

1. A microchannel spatial light modulator that comprises, in combination:
   a photocathode that acts as a source of photoelectrons whose spatial distribution is proportional to the spatial distribution of light incident upon the photocathode, that is, the photocathode provides an electron image of an image in the incident light;
   a microchannel plate to receive said photoelectrons and amplify the electron image;
   an electro-optic plate coated on one side thereof with a dielectric mirror and an insulating light-blocking layer to receive the thusly amplified electron image and on the other side thereof with a transparent electrode; and
   an electro-optic plate dc bias supply connected to the transparent electrode to establish a spatially varied electric field across the thickness dimension of the electro-optic plate to bias said electro-optic plate, the intensity of the field at any region of the electro-optic plate being a function of the electron image intensity, which field creates a spatially varied index of refraction within said electro-optic plate which alters the phase of light traversing the electro-optic plate.

2. A microchannel spatial light modulator as claimed in claim 1 to modulate phase of an incoming light beam, wherein the electro-optic plate is formed of a material having controllable resistivity.

3. A microchannel spatial light modulator as claimed in claim 1 to modulate intensity of an incoming beam wherein the electro-optic plate is formed of a material having controllable resistivity.

4. A microchannel spatial light modulator as claimed in claim 1 that includes a microchannel plate dc bias supply connected to said microchannel plate.

5. A microchannel spatial light modulator as claimed in claim 4 including means to erase the electron image from the surface of the light blocking layer comprising a pulsed power supply interconnected with the electro-optic plate dc bias supply and the microchannel plate dc bias supply.

6. A microchannel spatial light modulator as claimed in claim 5 having a pulsed source of blue or near ultraviolet erase light which is positioned in such a way as to flood the electro-optic plate, the dielectric mirror and the light-blocking layer with a pulse of light which is synchronized with the pulsed power supply to assist in electron erasure.

7. A microchannel spatial light modulator as claimed in claim 1 having a beam splitter to reflect unprocessed light into the electro-optic plate, the unprocessed light being processed in and by the electro-optic plate and being reflected by the dielectric mirror back through and from the electro-optic plate and through the beam splitter which is adapted to transmit at least some of the processed light, and means to interpret the processed light after it has passed through the beam splitter.

8. A microchannel spatial light modulator as claimed in claim 7 that further includes a first linear polarizer to polarize the unprocessed light and a second linear polarizer that can be rotated relative to the first linear polarizer to polarize the processed light to effect phase and intensity modulation thereof.

9. A microchannel spatial light modulator as claimed in claim 1 wherein the materials of both the light-blocking layer and the dielectric mirror have high electrical-resistivity-dielectric-constant products to effect long-term storage of a message.

10. A microchannel spatial light modulator as claimed in claim 1 wherein the microchannel plate is a porous semiconducting glass having at each of its major surfaces a conductive coating to serve respectively as a first electrode to receive electrons from the photocathode and a second electrode to interact with the first electrode and create an electric field in the porous semiconducting glass plate to draw electrons through the porous semiconducting glass from the first electrode to the second electrode, there being amplification in the number of electrons between the first electrode and the second electrode so that there is an amplified electron image at the second electrode.

11. A microchannel spatial light modulator as claimed in claim 10 in which the light-blocking layer faces the second electrode and in which there is a vacuum gap therebetween.

12. A microchannel spatial light modulator as claimed in claim 11 having a vacuum enclosure with a first window to transmit incident light upon the photocathode and a second window to transmit light to and from the electro-optic plate.

13. A microchannel spatial light modulator as claimed in claim 11 having a conducting grid disposed in said gap and adapted to connect to a source of electric potential to control electron flow in the gap.

14. A microchannel spatial light modulator as claimed in claim 10 having a dc voltage source connected to bias the photocathode relative to said first electrode.

15. A microchannel spatial light modulator as claimed in claim 10 having electric potential means connected to establish an electric potential between the first electrode and the second electrode of the microchannel plate and having a resistor in series with one of these electrodes to act as a current limiter.

16. A microchannel spatial light modulator as claimed in claim 1 in which at least one of the light-blocking layer, the dielectric mirror and the electro-optic plate is made of a photoconductive material to effect erasure of the electron image upon being flooded with blue or near ultraviolet erase light.

17. A coherent optical signal processor comprising a microchannel spatial light modulator as claimed in claim 1 and further including a source of write light containing a message which generates photoelectrons from the photocathode, which photoelectrons are then amplified in number by the microchannel plate and applied to the light-blocking layer, and a source of coherent laser read light which is processed by the electro-optical plate in accordance with said message.

18. A signal processor as claimed in claim 17 that further includes means to receive the processed laser read light and operable to interpret the message carried thereby.

19. A system for projection of color television images that comprises three microchannel spatial light modulators as claimed in claim 1 and a CRT associated with each modulator to act as a source of write light for the associated modulator and to provide red light to the first modulator, green light to the second modulator and blue light to the third modulator, a source of read light and means to filter, polarize and separate the read light into red, green and blue components that are directed upon the appropriate modulator and reflected therefrom as beams, and means to mix the reflected beams and project the same upon a large screen.

20. A microchannel spatial light modulator that comprises in combination:
a photocathode that acts as a source of photoelectrons whose spatial distribution is proportional to the spatial distribution of light incident upon the photocathode, that is, the photocathode provides an electron image of an image in the incident light;
a microchannel plate to receive said photoelectrons and amplify the electron image, the microchannel plate being a porous semiconducting glass plate having at each of its major surfaces a conductive coating to serve respectively as a first electrode to receive electrons from the photocathode and a second electrode to interact with the first electrode and create an electric field in the porous semiconducting glass plate to draw electrons through the porous semiconducting glass plate from the first electrode to the second electrode, there being amplification in the number of electrons between the first electrode and the second electrode so that there is an amplified electron image at the second electrode;
an electro-optic plate coated on one side thereof with a dielectric mirror and an insulating light-blocking layer to receive the thusly amplified electron image and on the other side thereof with a transparent electrode;
means for applying a bias potential to said transparent electrode, said transparent electrode serving, when an appropriate bias is applied thereto, to bias the electro-optic plate, which dielectric mirror faces the second electrode but with a vacuum gap therebetween;
a conducting grid disposed in said vacuum gap and adapted to connect to a source of electric potential to control electron flow in the gap; and
a source of electric potential connected to said grid to control electron flow and to strip electrons from the dielectric mirror to effect erasure.

21. A microchannel spatial light modulator as claimed in claim 20 having a pulsed source of blue or near ultraviolet erase light which is positioned to flood the electro-optic plate, the dielectric mirror and the light-blocking layer with a pulse of light which is synchronized with the grid power supply to assist in electron erasure.

22. A microchannel spatial light modulator to receive radiation in the extreme ultraviolet and soft-x-ray region of the electromagnetic spectrum, that comprises, in combination:
a microchannel plate to receive said radiation and to generate photoelectrons in the form of an electron image, which image is amplified by the channels of the microchannel plate to provide an amplified electron image; and
an electro-optic plate coated on one side thereof with a dielectric mirror and a light-blocking layer to receive the thusly amplified electron image and on the other side thereof with a transparent electrode; means for applying a bias potential to said transparent electrode, said transparent electrode serving, when an appropriate electric bias potential is applied thereto, to bias the electro-optic plate.

23. A microchannel spatial light modulator to modulate at least one of the phase and intensity of incoming light, that comprises: microchannel plate means positioned to receive the incoming light and operable to generate photoelectrons in the form of an electron image, which image is amplified by the channels of the microchannel plate to provide an amplified electron image; electro-optic plate means coated on one side thereof with a dielectric mirror and a light-blocking layer to receive the thusly amplified electron image and on the other side thereof with a transparent electrode; means for applying a bias potential to said transparent electrode, said transparent electrode serving when an electric bias potential is applied thereto, to bias the electro-optic plate means.

24. A microchannel spatial light modulator as defined by claim 23 that has a vacuum enclosure surrounding the microchannel plate means and the electro-optical plate means, both the microchannel plate means and the electro-optic plate means having planar surfaces which are disposed parallel to one another, the microchannel plate means being separated from the electro-optic plate means by a small vacuum gap.

* * * * *